July 29, 1930.  H. M. ARMSTRONG  1,771,908
SCOTOMETER
Filed Nov. 9, 1929    6 Sheets-Sheet 2

INVENTOR
Hugh M. Armstrong
BY
Richard E. Babcock
ATTORNEY

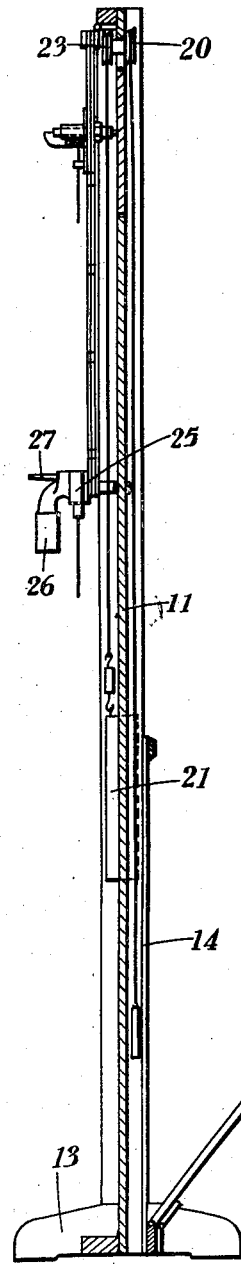
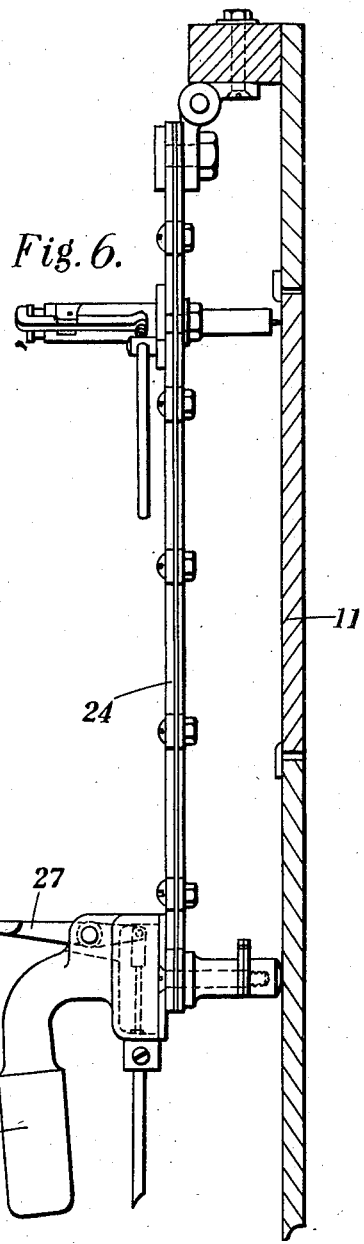

July 29, 1930. H. M. ARMSTRONG 1,771,908
SCOTOMETER
Filed Nov. 9, 1929   6 Sheets-Sheet 4
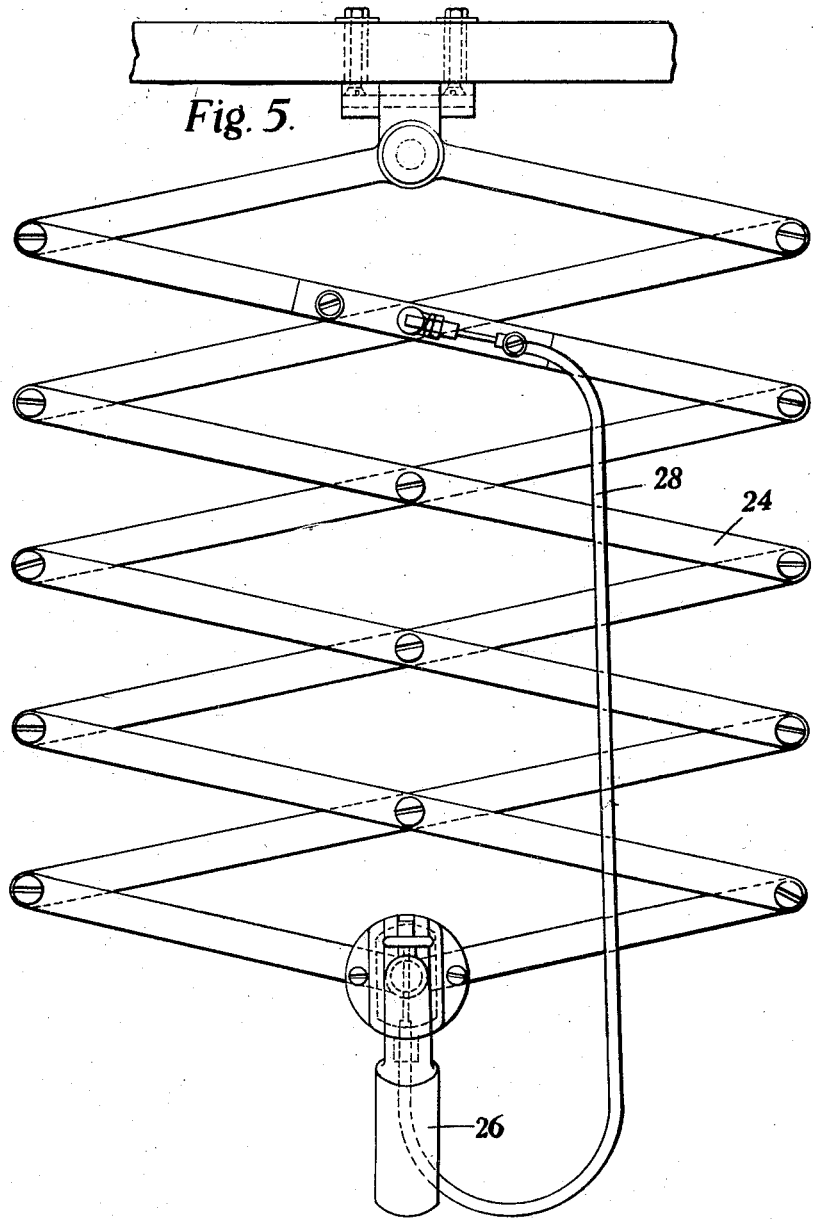
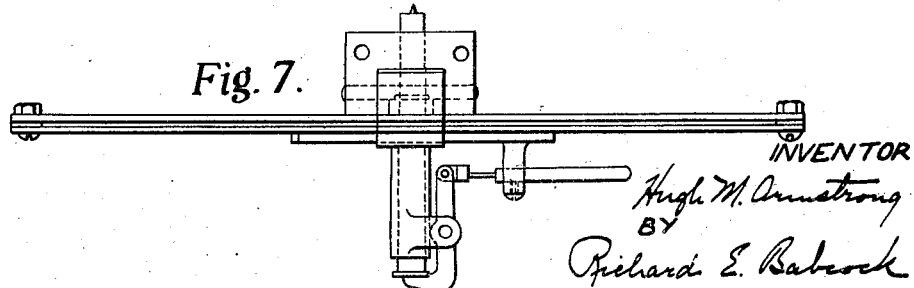
INVENTOR
Hugh M. Armstrong
BY
Richard E. Babcock
ATTORNEY July 29, 1930. H. M. ARMSTRONG 1,771,908
SCOTOMETER
Filed Nov. 9, 1929 6 Sheets-Sheet 5
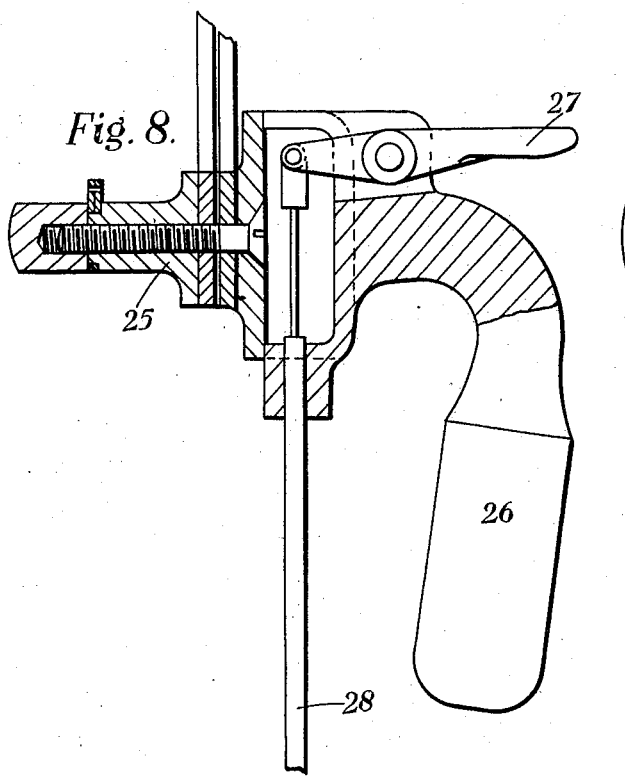
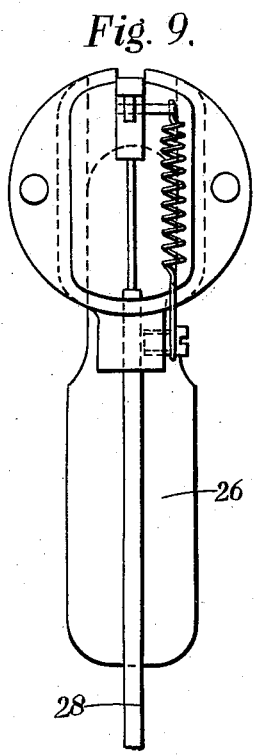
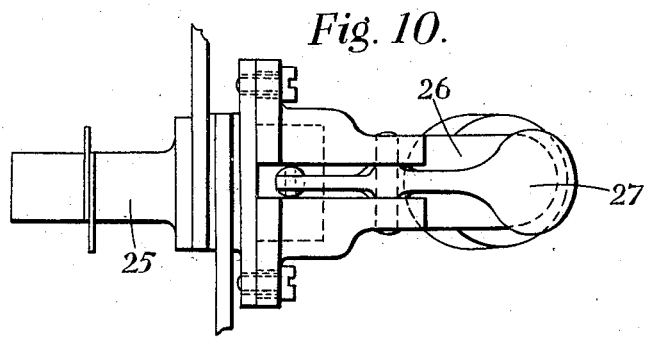
INVENTOR
Hugh M. Armstrong
BY
Richard E. Babcock
ATTORNEY July 29, 1930.  H. M. ARMSTRONG  1,771,908
SCOTOMETER
Filed Nov. 9, 1929   6 Sheets-Sheet 6

INVENTOR
Hugh M. Armstrong
BY
Richard E. Babcock
ATTORNEY

Patented July 29, 1930

1,771,908

UNITED STATES PATENT OFFICE

HUGH MAXWELL ARMSTRONG, OF BEDFORD, ENGLAND

SCOTOMETER

Application filed November 9, 1929, Serial No. 405,990, and in Great Britain July 4, 1928.

This invention has relation to instruments by which the relative and absolute blind areas of the eyes of a person can be mapped out and has relation to that type of instrument known as a scotometer.

A scotometer has been proposed in which a spot or object is formed or fitted so as to be responsive to the movement of a magnet held behind the test board or disc, the magnet being combined with means for making a mark or prick at the desired places on or in a chart secured on the back of the board or disc.

A scotometer, according to this invention, comprises Bjerrum screen having a fixed point thereon, an object, for example, a white or coloured bead, suspended in front of, and movable in relation to, the screen recording means disposed at the rear of the screen and connected to the object to move in synchronism therewith, and motion reducing mechanism in the connection.

In order that the invention, the object and nature of which have been set forth, may be particularly described and ascertained, reference will now be made to the constructional embodiment of the invention illustrated in the accompanying drawings, in which:—

Figure 1:
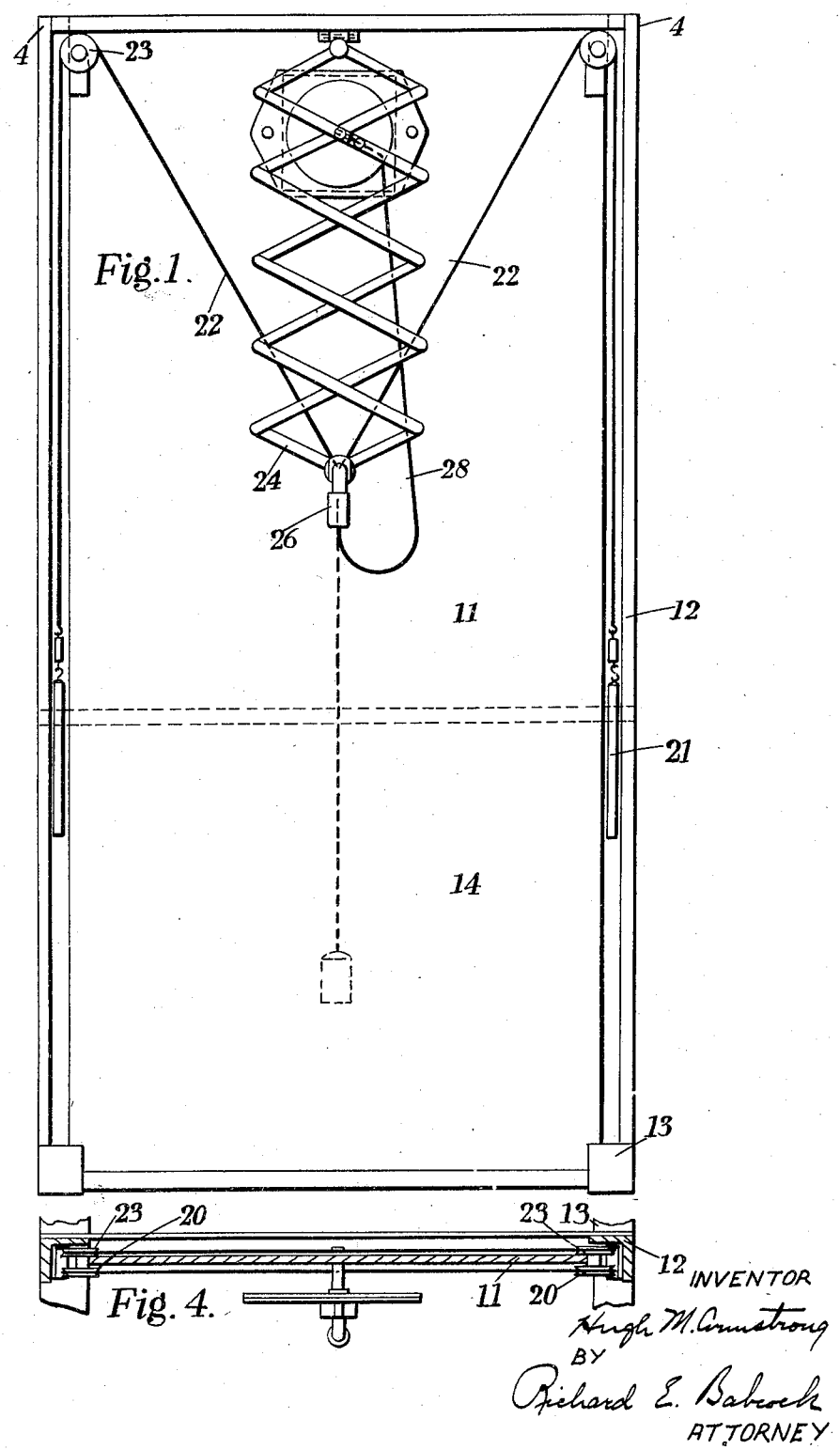
Figure 2:
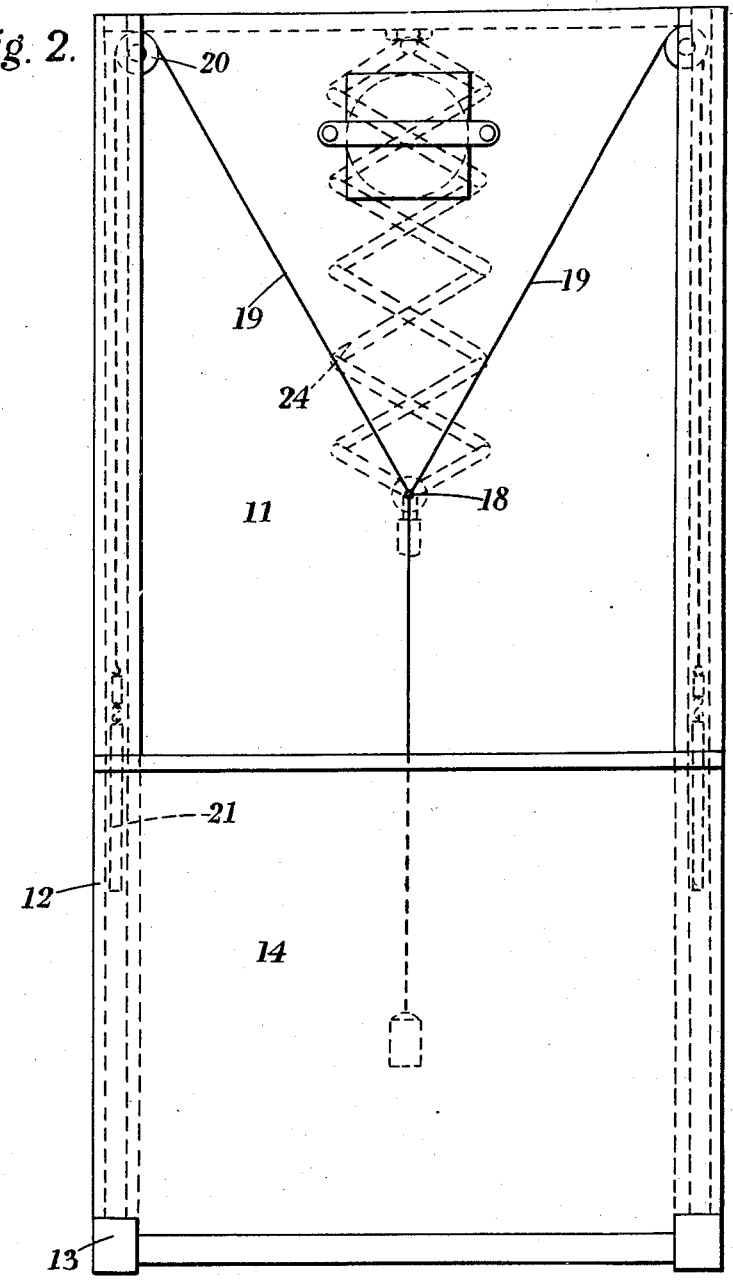
Figure 11:
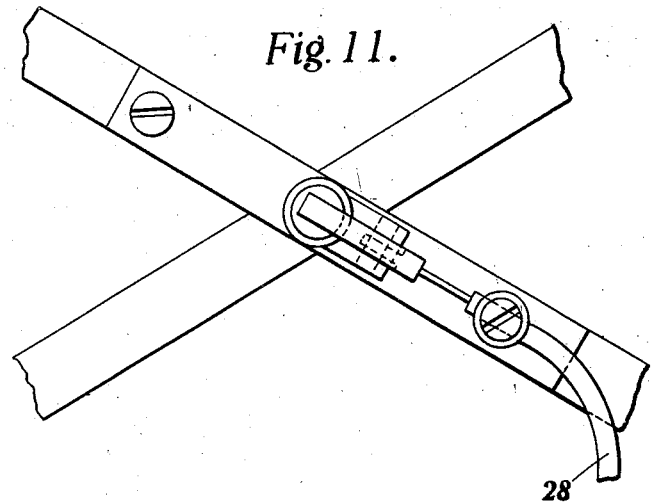
Figure 12:
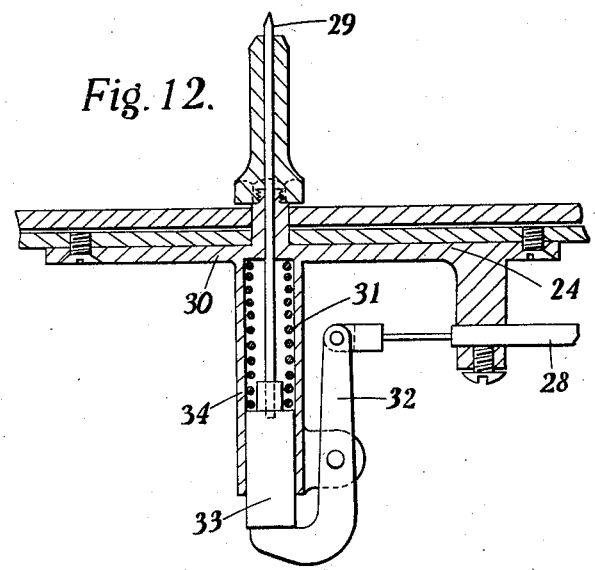

Fig. 1 is a rear elevational view.
Fig. 2 a front elevational view.
Fig. 3 a side view.
Fig. 4 a sectional view on the line 4—4 of Fig. 1.
Figs. 5, 6 and 7 are, respectively, elevational, side and plan views of the pantograph.
Figs. 8, 9 and 10 are, respectively, a sectional elevation, rear view and a plan of the handle of the pantograph and the trigger by which the pricker shown in rear view and in section in Figs. 11 and 12, respectively, is operated.

The Bjerrum screen comprises a panel 11 mounted in a frame 12 supported in a vertical position by feet 13. 14 is a second panel mounted in the frame 12 in front of, but spaced from, the panel 11. The panel 14 is mounted at the lower part of the panel 11, the part of which above the panel 14 is covered with black cloth. 15 is a framework pivotally attached at its lower end to the lower part of the frame 12 or to the feet 13 and supported in an inclined position by a strut or prop 16. Adjustably mounted on the upper end of the framework 15 is a chin rest 17.

The Bjerrum screen has a fixed point or spot mounted in a position such that the eye of a person under examination can, by adjustment of the chin rest 17, be brought exactly opposite. 18 is the movable object consisting of a white or coloured bead. The object 18 is suspended in front of the screen, the suspensory means comprising two cords 19 or the like, each of which is led to a top front corner of the screen and then over a pulley 20 mounted in the frame 12. The cords 19 extend down the opposite sides of the frame 12 and to the ends are attached weights 21. To the weights 21 other cords 22 are also attached. These cords 22 are led up the opposite sides of the frame 12 and then over pulleys 23 mounted on the frame 12 at the top rear corners thereof. The pulleys 20, 23 at each corner are disposed side by side and are, preferably, mounted on a common spindle. The cords 22, after passing over the pulleys 23 are led down behind the screen and are connected with a pantograph 24 at the point at which the tracer or stylus would ordinarily be positioned. The pantograph 24 is pivotally mounted on an upper and horizontal member of the frame 12 and at the point at which the tracer or stylus would ordinarily be positioned there is a bracket 25 which, in addition to forming an anchorage for the cords 22, constitutes a carrier for a handle 26 by which the pantograph is operated and which may be integral with the bracket 25. On the handle 26 a lever or trigger 27 is pivotally mounted and constitutes the operating means of a Bowden wire mechanism 28 and which is led to the part of the pantograph 24 on which the recording means is mounted. The recording means is connected with the Bowden wire mechanism and is moved into and out of operative position by operation of the trigger or lever 27. The recording means may comprise a pencil or, and preferably, as shown, a pricker or needle 29. The pricker or needle 29 is mounted in a carrier 30 secured to the outer face of one of the constituent members of the pantograph 24, and is under the action of a spring 31, which tends to hold it in its inoperative position. The Bowden wire mechanism acts on the pricker or needle 29 through a lever 32 and a piston 33 contained in a cylinder 34 forming part of the carrier 30. The pricker or needle is mounted on the piston 33.

The cords 19, 22 are made of such length that the object 18 occupies a position in front of the screen that is coincident with point on the pantograph 24 at which the tracer or stylus would ordinarily be mounted.

35 is a frame to receive a chart or record sheet; the frame is mounted on the back of the screen and positioned opposite the area of movement of the pricker or needle 29.

In use, the patient is seated opposite the Bjerrum screen and is caused to rest his chin on the rest 17, which is then adjusted so as to bring the eye under examination exactly opposite the fixed point. The object 18 is moved in relation to the screen by the operator grasping the handle 26 and moving the pantograph 24. Each time the patient announces that the object 18 is out of his range of sight, the operator actuates the lever or trigger 27 and makes a record on the chart.

I claim:

1. A scotometer, comprising in combination, a Bjerrum screen having a fixed view point indicated thereon, a movable object suspended in front of said screen, means for moving said object as desired, pantograph mechanism for reproducing the travel of the movable object, an operating handle adapted to control the movement of the said movable object, trigger mechanism mounted on said handle, recording means located in said pantograph, and a flexible transmission means between the trigger mechanism and said recording means substantially as described.

2. A scotometer, comprising in combination, a Bjerrum screen having a fixed view point indicated thereon, a movable object suspended in front of said screen, means for moving said object as desired, pantograph mechanism for reproducing the travel of the movable object, an operating handle adapted to control the movement of the said movable object, trigger mechanism mounted on said handle, recording means located in said pantograph, said means comprising a spring return pricker and flexible transmission means between said trigger mechanism and said spring return pricker substantially as described.

3. A scotometer, comprising a combination of a Bjerrum screen having a fixed view point indicated thereon, a movable object suspended in front of said screen, an operating handle adapted to control the movement of said movable object, weight loaded cords connecting said movable object and said handle, pantograph mechanism attached to said operating handle, trigger mechanism mounted on said handle, spring returned pricker mounted on said pantograph and flexible transmission means between said trigger mechanism and said pricker substantially as described.

4. A scotometer comprising in combination a Bjerrum screen having a fixed view point indicated thereon, a movable object suspended in front of said screen, an operating handle adapted to control the movement of said movable object, weight loaded cords connecting said object and said operating handle, pantograph mechanism attached to said operating handle, trigger mechanism carried by said handle, spring returned recording pricker, a bell crank lever for operating said pricker and Bowden wire transmission between said trigger mechanism and said bell crank lever, substantially as described.

In testimony whereof he has signed his name to this specification.

HUGH MAXWELL ARMSTRONG.